United States Patent
Kawamura (10) Patent No.: US 9,826,219 B2
(45) Date of Patent: Nov. 21, 2017

(54) IMAGING APPARATUS, IMAGING SYSTEM, IMAGING METHOD, AND IMAGE PROCESSING METHOD

(71) Applicant: PANASONIC CORPORATION, Osaka (JP)

(72) Inventor: Takashi Kawamura, Kyoto (JP)

(73) Assignee: PANASONIC CORPORATION, Osaka (JP)

(*) Notice: Subject to any disclaimer, the term of this patent is extended or adjusted under 35 U.S.C. 154(b) by 429 days.

(21) Appl. No.: 13/993,213

(22) PCT Filed: Dec. 10, 2012

(86) PCT No.: PCT/JP2012/007863
§ 371 (c)(1),
(2) Date: Jun. 11, 2013

(87) PCT Pub. No.: WO2013/088690
PCT Pub. Date: Jun. 20, 2013

(65) Prior Publication Data
US 2014/0063203 A1 Mar. 6, 2014

(30) Foreign Application Priority Data
Dec. 12, 2011 (JP) .................. 2011-271357

(51) Int. Cl.
*H04N 13/02* (2006.01)
*G02B 7/36* (2006.01)
(Continued)

(52) U.S. Cl.
CPC ....... *H04N 13/0271* (2013.01); *G02B 3/0043* (2013.01); *G02B 3/0056* (2013.01);
(Continued)

(58) Field of Classification Search
USPC .................................................. 348/50, 140
See application file for complete search history.

(56) References Cited

U.S. PATENT DOCUMENTS 5,828,487 A 10/1998 Greening et al.
7,180,673 B2 2/2007 Dowski, Jr.
(Continued)

FOREIGN PATENT DOCUMENTS

JP 2006-184844 7/2006
JP 2008-245157 10/2008
(Continued)

OTHER PUBLICATIONS

Hajime Nagahara et al., "Flexible Depth of Field Photography", European Conference on Computer Vision (ECCV), Oct. 2008.*
(Continued)

*Primary Examiner* — James M Anderson, II
(74) *Attorney, Agent, or Firm* — Wenderoth, Lind & Ponack, L.L.P.

(57) ABSTRACT

An imaging apparatus which captures an image used for obtaining depth data indicating a depth of a captured scene and restored image data with a reduced optical blur, includes: an optical device which causes an optical blur having a rotationally asymmetric shape; an actuator which rotates a part or a whole of the optical device; and an imaging unit configured to capture the image each time the optical device is rotated, to generate a plurality of captured image data items.

10 Claims, 9 Drawing Sheets

(a) Standard position  (b) Rotated position (51) Int. Cl.
*G02B 3/00* (2006.01)
*G02B 3/08* (2006.01)
*G03B 15/00* (2006.01)

(52) U.S. Cl.
CPC ............... *G02B 3/08* (2013.01); *G02B 7/36* (2013.01); *G03B 15/00* (2013.01)

(56) References Cited

U.S. PATENT DOCUMENTS

| | | | |
|---|---|---|---|
| 7,679,830 B2 | 3/2010 | Dowski, Jr. | |
| 7,894,078 B2 * | 2/2011 | Gharib et al. | 356/601 |
| 2003/0122926 A1 * | 7/2003 | Kumei | H04N 5/2254 348/65 |
| 2008/0284898 A1 * | 11/2008 | Kandleinsberger et al. | 348/341 |
| 2009/0284627 A1 * | 11/2009 | Bando et al. | 348/273 |
| 2010/0073547 A1 * | 3/2010 | Ono | 348/340 |
| 2010/0118142 A1 * | 5/2010 | Ohsawa | G01C 3/08 348/140 |
| 2010/0309362 A1 * | 12/2010 | Nagata | 348/335 |
| 2010/0310165 A1 * | 12/2010 | Chen et al. | 382/167 |
| 2011/0267507 A1 * | 11/2011 | Kane | G02B 27/0075 348/241 |
| 2011/0316982 A1 * | 12/2011 | Steurer | 348/49 |
| 2012/0148108 A1 * | 6/2012 | Yahata | 382/106 |

FOREIGN PATENT DOCUMENTS

| | | |
|---|---|---|
| JP | 2008245157 A * | 10/2008 |
| JP | 2010-039448 | 2/2010 |

OTHER PUBLICATIONS

International Search Report dated Jan. 8, 2013 in corresponding International Application No. PCT/JP2012/007863.

Anat Levin et al., "4D Frequency Analysis of Computational Cameras for Depth of Field Extension", ACM Transactions on Graphics (Proceedings of ACM SIGGRAPH 2009), Aug. 2009.

Anat Levin et al., "Image and Depth from a Conventional Camera with a Coded Aperture", ACM Transactions on Graphics (Proceedings of ACM SIGGRAPH 2007), vol. 26, No. 3, Article 70, Jul. 2007.

Changyin Zhou et al., "Coded Aperture Pairs for Depth from Defocus", IEEE International Conference on Computer Vision (ICCV), Oct. 2009.

Chia-Kai Liang et al., "Programmable Aperture Photography: Multiplexed Light Field Acquisition", ACM Transactions on Graphics (Proceedings of ACM SIGGRAPH 2008), Aug. 2008.

Hajime Nagahara et al., "Programmable Aperture Camera Using LCoS", 11th European Conference on Computer Vision (ECCV 2010), Sep. 2010.

Federico Frigerio, "3-Dimensional Surface Imaging Using Active Wavefront Sampling", Massachusetts Institute of Technology, Department of Mechanical Engineering, Jan. 2006.

Edward R. Dowski et al., "Extended depth of field through wavefront coding", Applied Optics, vol. 34, No. 11, Apr. 10, 1995.

* cited by examiner

(a) Standard position    (b) Rotated position

IMAGING APPARATUS, IMAGING SYSTEM, IMAGING METHOD, AND IMAGE PROCESSING METHOD

TECHNICAL FIELD

The present invention relates to imaging apparatuses, imaging systems, imaging methods, and image processing methods, and relates particularly to an imaging apparatus, an imaging system, an imaging method, and an image processing method which are used for obtaining depth data indicating a depth of a captured scene and restored image data with a reduced optical blur.

BACKGROUND ART

An extended depth of field (EDOF) technique that can be used in reducing an optical blur and enlarging a in-focus range typically includes following two approaches.

A first approach is a technique using a single point spread function (PSF) which does not vary according to a depth. To be specific, an image is captured using an optical system configured to obtain the PSF which does not vary according to the depth. Then, the single PSF is used for performing restoration processing on a captured image. This is referred to as a depth invariant method, hereinafter.

As one of methods with highest efficiency in this approach, a method using an image which is captured with varying an in-focus position (focal sweep or flexible depth of field (F-DOF)) has been proposed (see non-patent literature (NPL) 1).

A second approach is a technique using a PSF which varies according to a depth. To be specific, in the technique, a depth of a captured scene (depth data) is detected and restoration processing is performed on a captured image using the PSF corresponding to the detected depth. This is referred to as a depth variant method, hereinafter.

As a representative method in this approach, a method is proposed which uses an image captured using a coded aperture or a lattice focal lens (see NPL 2 and NPL 3). Particularly, the lattice focal lens is known to extend a depth of field most efficiently, in the both approaches.

In addition, the depth variant method also has an advantage that the depth data which cannot be obtained by the depth invariant method can be also obtained at once.

With such an EDOF technique, an optical blur in an area which is out of focus in a captured image can be reduced, to thereby extend the depth of field of the captured image.

CITATION LIST

Non Patent Literature

[NPL 1] "Flexible Depth of Field Photography", H. Nagahara, S. Kuthirummal, C. Zhou, and S. K. Nayar, European Conference on Computer Vision (ECCV), October 2008

[NPL 2] "4D Frequency Analysis of Computational Cameras for Depth of Field Extension", Anat Levin, Samuel W. Hasinoff, Paul Green, Fredo Durand, and William T. Freeman ACM Transactions on Graphics (Proc. SIGGRAPH 2009)

[NPL 3] "Image and Depth from a Conventional Camera with a Coded Aperture", Anat Levin, Rob Fergus, Fredo Durand, William T. Freeman ACM Transactions on Graphics (Proc. SIGGRAPH 2007)

[NPL 4] "Coded Aperture Pairs for Depth from Defocus", C. Zhou, S. Lin, and S. K. Nayar, IEEE International Conference on Computer Vision (ICCV), October 2009

SUMMARY OF INVENTION

Technical Problem

In the aforementioned conventional techniques, a captured image which underwent restoration processing (hereinafter, referred to as "restored image") may have a low image quality.

In view of the above, the present invention provides an imaging apparatus capable of improving an image quality of the restored image, when the restored image is obtained from the captured image.

Solution to Problem

An imaging apparatus according to an aspect of the present invention captures an image used for obtaining depth data indicating a depth of a captured scene and restored image data with a reduced optical blur. The imaging apparatus includes: an optical device which causes an optical blur having a rotationally asymmetric shape; an actuator which rotates a part or a whole of the optical device; and an imaging unit configured to capture the image each time the optical device is rotated, to generate a plurality of captured image data items.

It should be noted that these general and specific aspects may be implemented using a system, a method, an integrated circuit, a computer program, or a computer readable recording medium such as a CD-ROM, or may be implemented using any combination of systems, methods, integrated circuits, computer programs, or computer-readable recording mediums.

Advantageous Effects of Invention

With an imaging apparatus according to an aspect of the present invention, an image quality of a restored image can be improved.

DESCRIPTION OF EMBODIMENTS

[Underlying Knowledge Forming Basis of the Present Invention]

An inventor of the present invention has found a problem that in the aforementioned depth variant method, an image quality of a restored image obtained by restoration processing is lower than that in the depth invariant method. The following shall describe the problem.

In the aforementioned depth variant method, a depth (depth data) of a captured scene is detected using a property that a captured image has a spatial frequency component with a value of zero or a value approximated to zero. Therefore, an optical device should be implemented in a manner that a part of frequency components lacks or is remarkably lost in the captured image.

Even if the restoration processing is performed on the captured image in which a part of the spatial frequency components is lacked or remarkably-lost, the lacked or remarkably-lost spatial frequency component cannot be restored. This deteriorates the image quality of the restored image. To be specific, when an image of an object which has the lacked or remarkably-lost spatial frequency component is captured, a part of the restored image corresponding to the lacked or remarkably lost spatial frequency component has a blur or ringing artifacts.

In view of the above, the present invention provides, when a restored image with a reduced blur is obtained from a captured image, an imaging apparatus or an imaging method which are capable of capturing an image for improving the image quality of the restored image, or an imaging system or an image processing method which are capable of improving the image quality of the restore image.

An imaging apparatus according to an aspect of the present invention captures an image used for obtaining depth data indicating a depth of a captured scene and restored image data with a reduced optical blur. The imaging apparatus includes: an optical device which causes an optical blur having a rotationally asymmetric shape; an actuator which rotates a part or a whole of the optical device; and an imaging unit configured to capture the image each time the optical device is rotated, to generate a plurality of captured image data items.

With the above configuration, the optical device causes the optical blur shaped in the rotational asymmetry. To be specific, an optical blur caused by the optical device before rotation and an optical blur caused by the optical device after rotation are different from each other in relation to an optical property in a two-dimensional planer space. Therefore, in the images each captured every time the optical device rotates, image components lost due to the optical blur in the two-dimensional planer space are different from each other. Accordingly, in the captured image data items, the image components lost due to the optical blur can be complemented with each other. Such captured image data items are used to generate restored image data, to thereby enable improvement of the image quality of the restored image.

Furthermore, with this configuration, the optical blur caused by the optical device can be varied by simply rotating the optical device. This eliminates the necessity for replacement of the optical device for capturing an image, to thereby enable easy capture of the image for obtaining the depth data and the restored image data. Furthermore, a shape of the optical blur caused by the optical device can be varied in a relatively short term, to thereby achieve the imaging apparatus having a high responsive property.

The optical blur is desirably expressed by a PSF, and the optical device desirably has the PSF which varies according to the depth.

With this configuration, the PSF can be varied according to the depth. To be specific, the optical device need not be configured so that the PSF does not vary according to the depth, to thereby enable simplification in the configuration of the optical device.

The optical device desirably has the PSF which includes one or more frequencies each of which has a frequency component value smaller than or equal to a predetermined threshold value in a spatial frequency domain.

With this configuration, one or more frequencies can exist in which the frequency component value of the PSF is smaller than or equal to the predetermined threshold value in the spatial frequency domain. Accordingly, a design or a configuration of the optical device can be facilitated.

The optical device desirably has the PSF in which at least one of a value and the number of the one or more frequencies varies according to the depth in the spatial domain, each of the one or more frequencies having the frequency component value smaller than or equal to the threshold value.

With this configuration, at least one of the value or the number of the frequency in which the frequency component value of the PSF is smaller than or equal to the predetermined threshold value in the spatial frequency domain can be varied according to the depth. Accordingly, the depth data can be generated with high accuracy by specifying the frequency in which the spatial frequency component lacks or is remarkably lost in the captured image data. Therefore, the depth data can be generated with high accuracy, and the image quality of the restored image data can be improved.

The optical device desirably has the PSF which has a plurality of peaks in a spatial domain.

With this configuration, the optical device can be configured so that the PSF has a plurality of peaks in the spatial domain. Therefore, a complementary effect can be improved in image components lost due to the optical blur in images captured every time the optical device is rotated.

The optical device desirably includes a lens having a plurality of areas whose in-focus positions are different from each other.

With this configuration, the optical device can include lenses having areas the in-focus positions of which are different from each other. If the depth of field is extended by the image captured using such lenses, the depth of field can be efficiently extended with smaller amount of light in comparison with a case where the depth of field is extended by images captured with varying the in-focus position. This achieves the restored image having a high signal to noise (SN) ratio.

The optical device desirably includes an aperture having a plurality of openings.

With this configuration, the optical device can include the aperture having the openings. Accordingly, the configuration of the optical device can be simplified.

An imaging system according to an aspect of the present invention includes: the aforementioned imaging apparatus;

and an image processing apparatus which performs processing on the captured image data items generated by the imaging apparatus to generate the depth data and the restored image data, in which the image processing apparatus includes: a depth data generating unit configured to generate the depth data based on a frequency having a spatial frequency component value which is smaller than or equal to a predetermined threshold value in at least one of the captured image data items; and a restoration processing unit configured to perform restoration processing on the captured image data items based on the optical blur corresponding to each of the captured image data items, to generate the restored image data.

With the above configuration, effects which are similar to those obtained by the aforementioned imaging apparatus can be obtained. In addition to this, the depth data and the restored image data with a high image quality can be generated using the captured image data items generated by the imaging apparatus.

An imaging method according to an aspect of the present invention is used for capturing an image used for obtaining depth data indicating a depth of a captured scene and restored image data with a reduced optical blur, using an imaging apparatus including an optical device which causes an optical blur having a rotationally asymmetric shape and an actuator for rotating the optical device. The imaging method includes: capturing an image; rotating a part or a whole of the optical device using the actuator; and capturing the image after the optical device is rotated.

With the above, effects similar to those obtained by the aforementioned imaging apparatus can be obtained.

An image processing method according to an aspect of the present invention is used for capturing an image using an imaging apparatus including an optical device which causes an optical blur having a rotationally asymmetric shape and an actuator which rotates the optical device, and performing processing on the captured image. The image processing method includes: capturing the image to generate a first captured image data item; rotating a part or a whole of the optical device using the actuator; capturing the image after the optical device is rotated, to generate a second captured image data item; generating depth data indicating a depth of a captured scene based on a frequency having a spatial frequency component value which is smaller than or equal to a predetermined threshold value in at least one of the first captured image data item and the second captured image data item; and performing restoration processing on the captured image data items based on the optical blur corresponding to each of the first and second captured image data items, to generate restored image data.

With the above, effects similar to those obtained by the aforementioned imaging system can be obtained.

Hereinafter, certain exemplary embodiments are described in greater detail with reference to the accompanying drawings. Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended claims and their equivalents. Therefore, among the structural elements in the following exemplary embodiments, structural elements not recited in any one of the independent claims are described as arbitrary structural elements.

Embodiment

Figure 1:
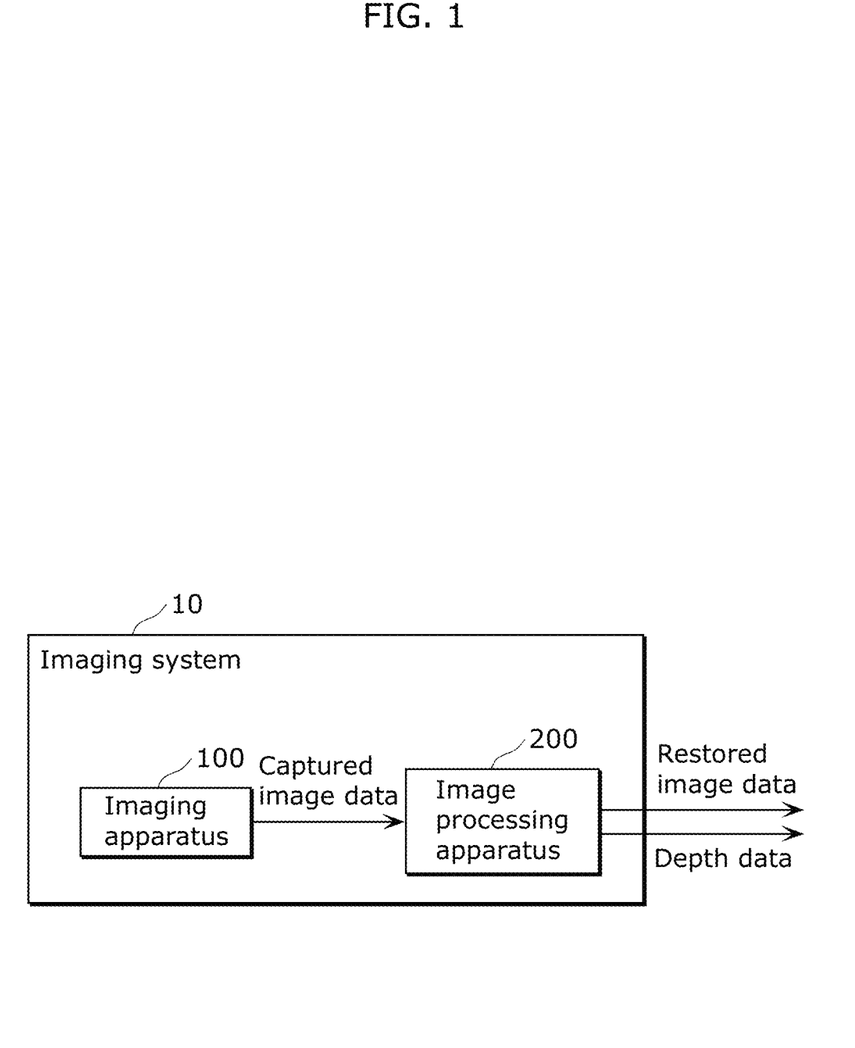
FIG. 1 is a diagram which shows an example of a configuration of an imaging system according to an embodiment.

FIG. 1 is a block diagram which shows a configuration of an imaging system according to an embodiment. As shown in FIG. 1, an imaging system 10 includes an imaging apparatus 100 and an image processing apparatus 200. The imaging system 10 may be referred to as a captured-image processing apparatus.

The imaging apparatus 100 captures an image for obtaining depth data and restored image data. Specifically, the imaging apparatus 100 is, for example, a digital still camera, digital video camera, or the like.

The depth data is data indicating a depth of a captured scene. Specifically, the depth data is data indicating a distance from the imaging apparatus 100 to an object for each pixel or each area. The depth data is useful for image processing. For example, the depth data is used for converting a two-dimensional image data to a three-dimensional image data having a right-eye image and a left-eye image. The depth data may also be used, for example, in the image processing in which an area corresponding to a background in a two-dimensional image is specified, and only the specified area is defocused.

The restored image data is image data obtained by performing restoration processing on an image. The restoration processing is processing of reducing a blur in an image and making the image sharp. The restored image data in the present invention indicates image data in which the optical blur is reduced by the restoration processing, i.e., image data in which the depth of field is more extended than that in the captured image data.

The image processing apparatus 200 obtains a plurality of captured image data items from the imaging apparatus 100. Specifically, the image processing apparatus 200 is, for example, a personal computer or a cloud server. The image processing apparatus 200 obtains the captured image data items from the imaging apparatus 100 via a wired or wireless network, a recording medium, or the like, for example. Furthermore, the image processing apparatus 200 performs processing on the captured image data items generated by the imaging apparatus 100, to thereby generate the depth data and the restored image data.

It should be noted that each of the imaging apparatus 100 and the image processing apparatus 200 is not necessarily achieved as an individual device. For example, the image processing apparatus 200 may be incorporated in the imaging apparatus 100. For the occasion, the image processing apparatus 200 may be achieved as a single integrated circuit.

The following shall first describe a configuration of the imaging apparatus 100 in detail.

Figure 2:
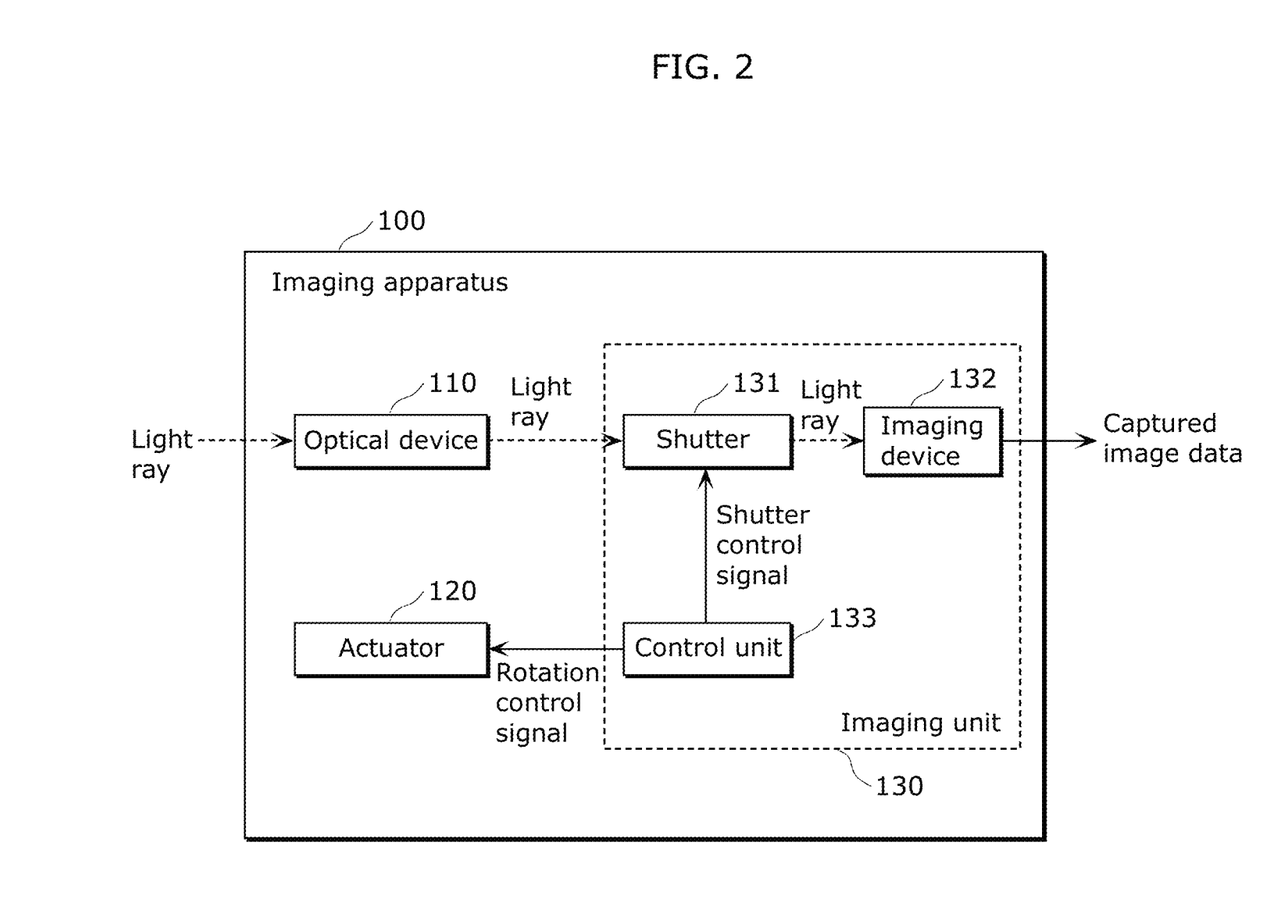
FIG. 2 is a block diagram which shows a configuration of an imaging apparatus according to the embodiment.

FIG. 2 is a block diagram which shows a functional configuration of an imaging apparatus according to the embodiment. As shown in FIG. 2, the imaging apparatus 100 includes an optical device 110, an actuator 120, and an imaging unit 130. The following shall describe respective components included in the imaging apparatus 100.

The optical device 110 is disposed rotatably. In the present embodiment, the optical device 110 is disposed rotatably about an axis parallel to an optical axis. It should be noted that a rotation axis is not necessarily parallel to the optical axis. In other words, the rotation axis of the optical device 110 is not necessarily limited to a specified direction.

The optical device 110 causes the optical blur having the rotationally asymmetric shape. Specifically, the optical device 110 is configured so that the shape of the optical blur also varies in a manner like being rotated, when the optical device 110 is rotated.

In the present embodiment, the optical blur is expressed by a PSF. The optical device 110 is configured so that the PSF varies according to the depth. Accordingly, the PSF of the optical device 110 depends on the depth.

Figure 3:
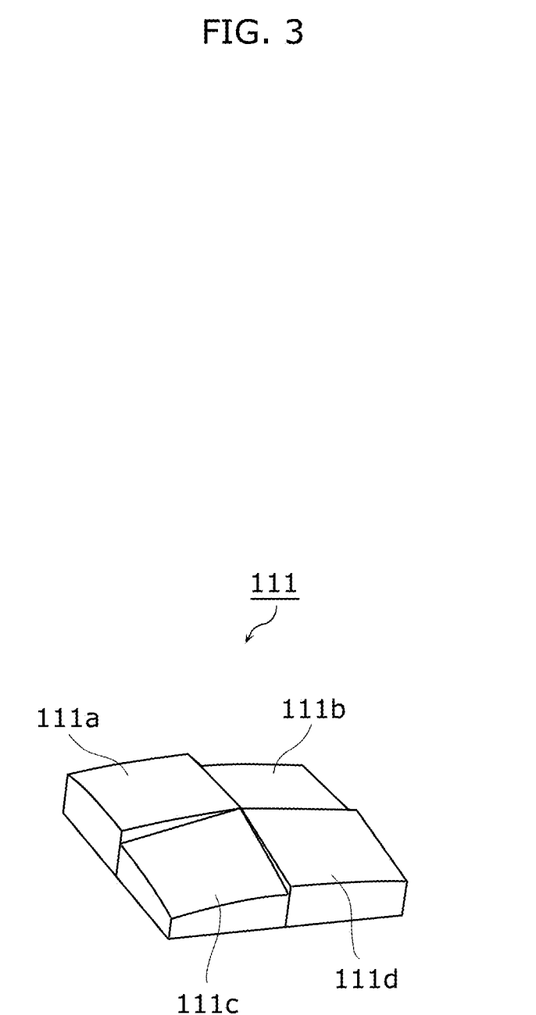
FIG. 3 is an external view which shows an example of a lens included in an optical device according to the embodiment.
Figure 4:
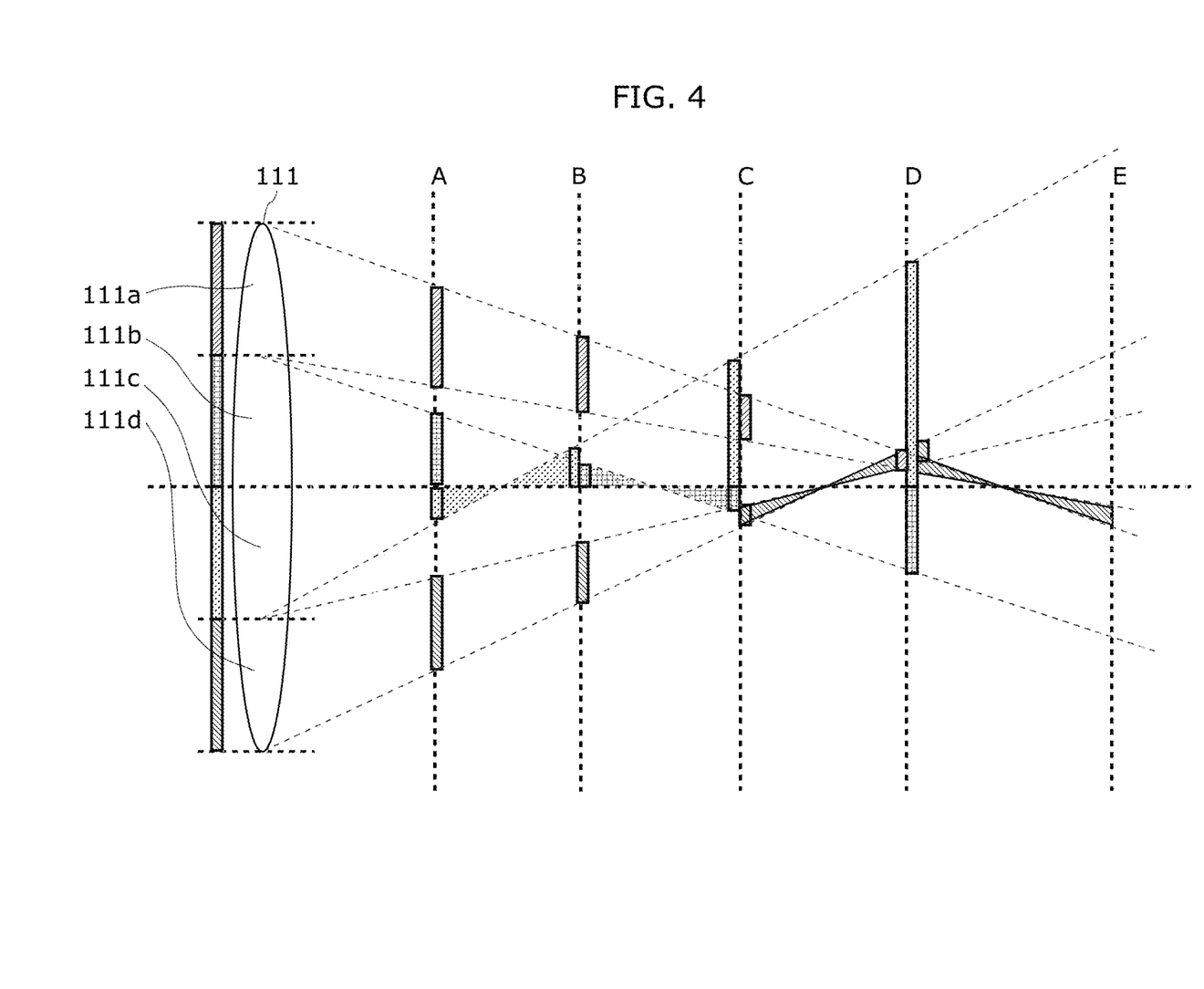
FIG. 4 is a diagram for illustrating an example of the optical device according to the embodiment.
Figure 5:
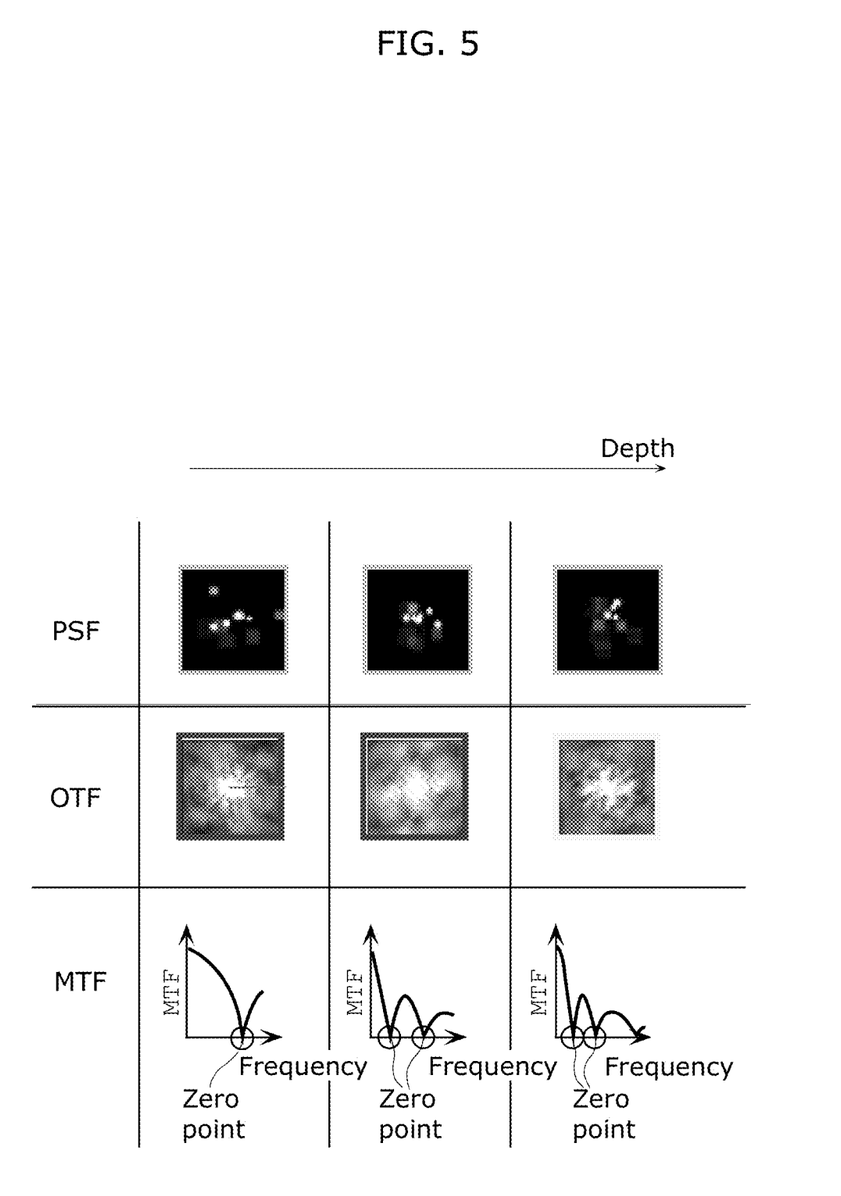
FIG. 5 is a diagram which shows an example of an optical blur caused by the optical device according to the embodiment.

Specifically, the optical device 110 may include, for example, a lens having a plurality of areas whose in-focus positions are different from each other. In other words, the optical device 110 may include, for example, a lattice focal lens. Referring to FIGS. 3 to 5, the optical device 110 is described taking, as an example, a case where the optical device 110 includes a lens having areas the in-focus positions of which are different from each other.

FIG. 3 is an external view which shows an example of a lens included in the optical device according to the embodiment. Here, the lens 111 included in the optical device 110 includes four areas 111a to 111d whose in-focus positions are different from one another. Specifically, the lens 111 is a rectangular-plate lens including the four areas 111a to 111d having respective surfaces whose inclination angles are different from one another.

The lens 111 corresponds to the lattice focal lens disclosed in NPL 3. If the depth of field is extended by the image captured using the lattice focal lens, the depth of field can be efficiently extended with smaller amount of light in comparison with a case where the depth of field is extended by the image captured with varying the in-focus position. With this, the restored image having a high SN ratio can be obtained.

FIG. 4 is a diagram for illustrating an example of the optical device according to the embodiment. Specifically, FIG. 4 shows travelling directions of light rays which have reached the optical device 110. It is assumed, for the convenience of description, that the four areas 111a to 111d of the lens 111 are juxtaposed in a direction perpendicular to the optical axis.

As is clear from FIG. 4, the in-focus positions of the respective areas are different from one another, so that the light rays passing through the respective areas are defocused differently. For example, when an imaging surface is disposed in a position A or a position B, a plurality of images are discretely formed, for a single object, with being defocused differently from one another. In other words, the optical device 110 is configured so that the PSF has a plurality of peaks in the spatial domain.

FIG. 5 is a diagram which shows an example of the optical blur caused by the optical device according to the embodiment. Specifically, FIG. 5 shows the PSF, an optical transfer function (OTF), and a modulation transfer function (MTF), in relation to the optical device 110. The OTF indicates a magnitude of a component obtained by performing Fourier-transform on the PSF. Specifically, the OTF is an amplitude value of the PSF represented in a spatial frequency domain. Meanwhile, the MTF is prepared by sectioning the OTF in a specific spatial axis direction. The MTF in FIG. 5 indicates a spatial frequency property in an X axis direction (horizontal axis direction) in the OTF which is also shown in FIG. 5.

As shown in FIG. 5, the PSF of the optical device 110 has a rotationally asymmetric shape. In other words, the optical device 110 is formed so that the PSF has the rotationally asymmetric shape.

The PSF of the optical device 110 varies according to the depth. In other words, the optical device 110 is configured so that the PSF varies according to the depth.

Furthermore, from the MTF in FIG. 5, the PSF has one or more frequencies in which a spatial frequency component value is smaller than or equal to a predetermined threshold value. Specifically, the optical device 110 is configured so that one or more frequencies exist in which a frequency component value of the PSF is smaller than or equal to the predetermined threshold value in the spatial frequency domain. The predetermined threshold value is zero or a value extremely close to zero. Hereinafter, the description refers to, as a zero point, a point on the frequency domain specified by the frequency in which a spatial frequency component value is smaller than or equal to the predetermined threshold value.

At least one of a position and the number of the zero point varies according to the depth. In other words, the optical device 110 is configured so that at least one of a value or the number of one or more frequencies in which the frequency component value of the PSF is smaller than or equal to the predetermined threshold value varies according to the depth in the spatial frequency domain.

As can be seen from the OTF, the optical device 110 is configured so that the PSF has a plurality of peaks in the spatial domain.

It should be noted that the optical device 110 described referring to FIGS. 3 to 5 is an example, so that the optical device 110 need not necessarily include such a lens 111. For example, the lens 111 included in the optical device 110 need not necessarily include four areas. The lens 111 may include two or three, or five or more areas whose in-focus positions are different from one another.

The lens 111 is not necessarily a rectangular plate lens. For example, the lens 111 may have a circular plate shape. In addition, the lens 111 may have, for example, a three-dimensional shape like a prism.

The lens 111 need not necessarily include a plurality of areas having surfaces whose inclination angles are different from one another. For example, the lens 111 may include a plurality of areas whose curved surfaces are different in shape from one another. Furthermore, the lens 111 may include, for example, a plurality of areas made of materials having refractive indexes different in each of the areas.

The optical device 110 may include a multifocal lens instead of the lens 111. The optical device 110 may also include a lens utilizing various types of lens aberration such as astigmatism, curved field, and the like. Even in the above cases, the optical device 110 can be configured to cause the PSFs indicating the asymmetric optical blurs different from each other according to a spatial direction as shown in FIG. 5.

Figure 6:
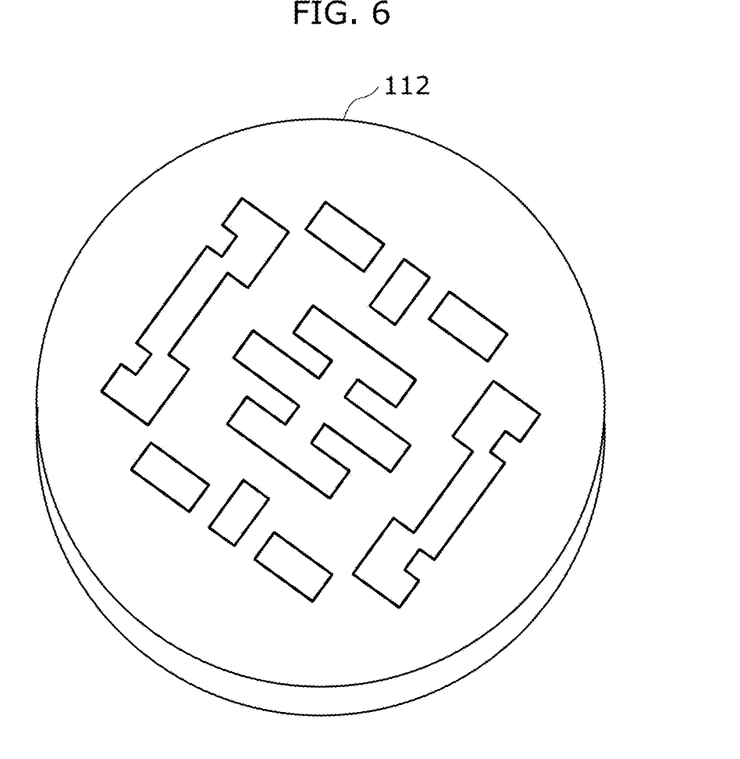
FIG. 6 is an external view which shows an example of an aperture included in the optical device according to the embodiment.

The optical device 110 may include a typical focal lens and an aperture which is shown in FIG. 6, instead of the lens 111. The optical device 110 may also include both of the lens 111 and the aperture shown in FIG. 6.

FIG. 6 is an external view which shows an example of an aperture included in the optical device according to the embodiment.

The aperture 112 includes a plurality of openings. The aperture 112 corresponds to a coded aperture disclosed in NPL 2. Even if the aperture 112 is included in the optical device 110, the optical device 110 can be configured to cause the PSFs indicating the asymmetric optical blurs different from each other according to the spatial direction as shown in FIG. 5.

It should be noted that the aperture 112 is an example of the aperture included in the optical device 110, and need not necessarily be the aperture shown in FIG. 6. In other words, the number and the shape of openings formed in the aperture need not necessarily be the number and the shape which are shown in FIG. 6.

Next, the following shall describe the actuator 120 included in the imaging apparatus 100 shown in FIG. 2.

The actuator 120 rotates a part or a whole of the optical device 110. Specifically, the actuator 120 rotates the optical device 110 in accordance with a rotation control signal from the imaging apparatus 130, using power generated by an electromagnet, for example.

As aforementioned, the PSF caused by the optical device 110 has a rotationally asymmetric shape. Accordingly, the actuator 120 rotates a part or a whole of the optical device 110, to thereby vary a shape of the PSF of the optical device 110.

Figure 7:
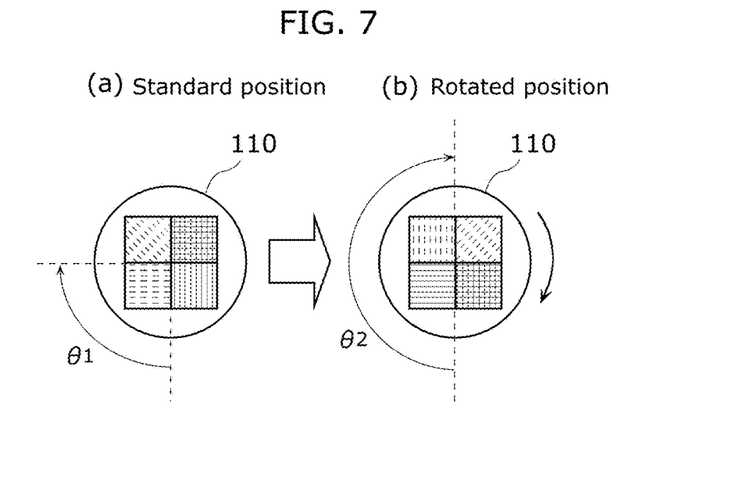
FIG. 7 is a diagram which shows an example of rotation of the optical device according to the embodiment.

FIG. 7 is a diagram which shows an example of rotation of the optical device according to the embodiment. Specifically, FIG. 7 is a diagram which shows the optical device 110 seen from an object side, before and after the rotation.

In FIG. 7, the actuator 120 rotates the optical device 110 so as to change an angle which indicates a position of the optical device 110 in the rotational direction from a first angle $\theta 1$ to a second angle $\theta 2$.

For the occasion, the position of the optical device 110 in the rotational direction is referred to as a standard position when the angle which indicates the position of the optical device 110 in the rotational direction is the first angle $\theta 1$, as shown in a state (a) of FIG. 7. The position of the optical device 110 in the rotational direction is referred to as a rotated position when the angle which indicates the position of the optical device 110 in the rotational direction is the second angle $\theta 2$, as shown in a state (b) of FIG. 7.

Although in FIG. 7, the rotational angle of the optical device 110 is 90 degrees, the rotational angle need not necessarily be 90 degrees. The actuator 120 may rotate the optical device 110 at any rotational angle, as long as the shape of the PSF of the optical device 110 is varied.

Next, the following shall describe the imaging unit 130 included in the imaging apparatus 100 shown in FIG. 2.

The imaging unit 130 generates a plurality of captured image data items by capturing an image at each rotation of the optical device 110. Specifically, the imaging unit 130 captures an image when the position of the optical device 110 in the rotational direction is the standard position, and then captures the image again when the position of the optical device 110 in the rotational direction is the rotated position. As shown in FIG. 2, the imaging unit 130 includes a shutter 131, an imaging device 132, and a control unit 133.

The shutter 131 controls incidence of the light rays to the imaging device 132. Specifically, the shutter 131 performs an opening and closing operation so as to allow passage of a light ray which has passed through the optical device 110 when capturing is performed, and to prevent the passage of the light ray when capturing is not performed. It should be noted that the shutter 131 performs the opening and closing operation in accordance with a shutter control signal from the control unit 133.

The imaging device 132 is a solid-state image sensing device, such as a charge coupled device (CCD) imaging sensor, a complementary metal oxide semiconductor imaging sensor, or the like. The imaging device 132 converts the received light to an electric signal to capture an image.

The control unit 133 controls the imaging apparatus 100. Specifically, the control unit 133 outputs the shutter control signal to the shutter 131 when a shutter button is pressed down, for example, so as to cause the shutter 131 to open and to close. The control unit 133 outputs the rotation control signal to the actuator 120 so as to cause the actuator 120 to rotate the optical device 110.

Next, the following shall describe an operation of the imaging apparatus 100 configured as above.

Figure 8:
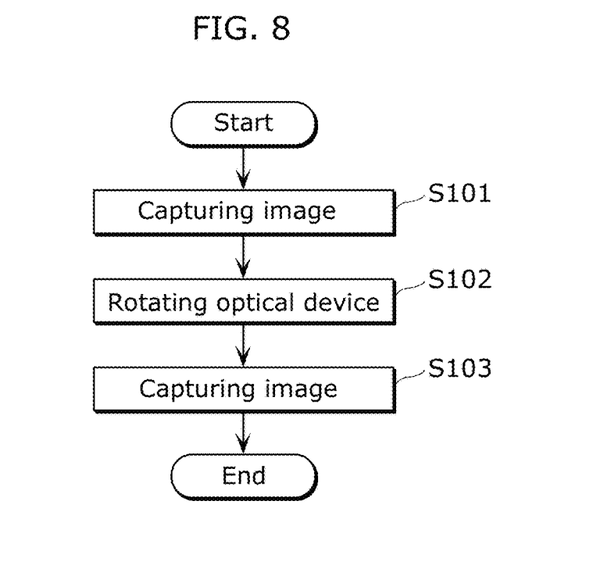
FIG. 8 is a flowchart which shows a processing operation performed by the imaging apparatus according to the embodiment.

FIG. 8 is a flowchart which shows a processing operation performed by the imaging apparatus according to the embodiment. Referring to FIG. 8, description is given to a case in which an initial position of the optical device 110 in the rotational direction is the standard position.

First, the imaging apparatus 130 captures an image to generate first captured image data (Step S101). The imaging apparatus 130 captures the image when the position of the optical device 110 in the rotational direction is the standard position. To be specific, the imaging apparatus 130 captures the image when the angle which indicates the position of the optical device 110 in the rotational direction is the first angle $\theta 1$.

Subsequently, the imaging unit 130 rotates a part or a whole of the optical device 110 using actuator 120 (Step S102). In other words, the imaging unit 130 changes the position of the optical device 110 in the rotational direction from the standard position to the rotated position. To be specific, the imaging unit 130 changes an angle which indicates the position of the optical device 110 in the rotational direction from the first angle $\theta 1$ to the second angle $\theta 2$.

Finally, the imaging unit 130 captures an image after the optical device 110 is rotated in the step S102, to thereby generate second captured image data (Step S103). In other words, the imaging unit 130 captures an image when the position of the optical device 110 in the rotational direction is the rotated position. To be specific, the imaging unit 130 captures an image when the angle which indicates the position of the optical device 110 in the rotational direction is the second angle $\theta 2$.

As described above, the imaging apparatus 100 can obtain the captured image data items for obtaining the depth data and the restored image data. Next, the description is given to a specific example of a processing operation performed by the imaging unit 130.

Figure 9:
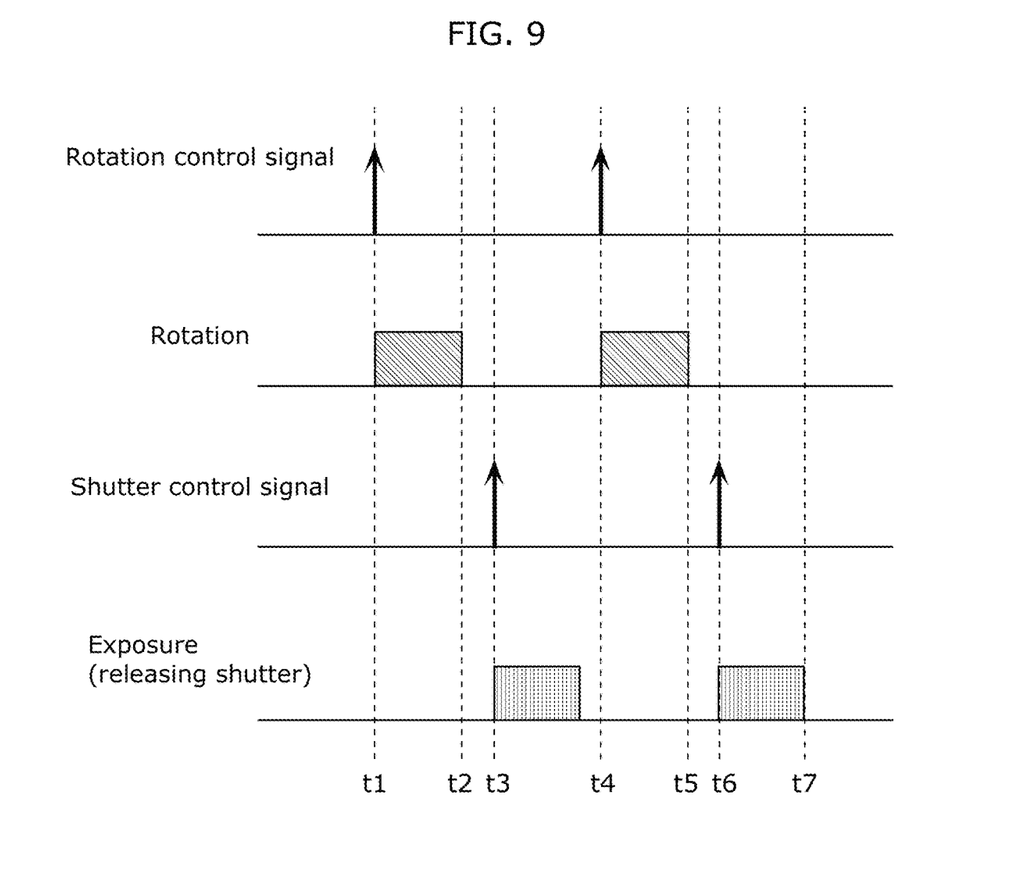
FIG. 9 is a diagram for illustrating the processing operation performed by the imaging apparatus according to the embodiment.

FIG. 9 is a diagram for illustrating the processing operations performed by the imaging apparatus according to the embodiment.

When the position of the optical device 110 in the rotational direction is not the standard position, the control unit 133 first generates the rotation control signal for allowing the position of the optical device 110 in the rotational direction to be the standard position, and outputs the rotation control signal to the actuator 120 (time t1). The actuator 120 rotates the optical device 110 in accordance with the rotation control signal from the control unit 133 (time t1 to t2). As a result, the position of the optical device 110 in the rotational direction becomes the standard position as shown in the state (a) of FIG. 7. In the present embodiment, the angle which indicates the position of the optical device 110 in the rotational direction is the first angle $\theta 1$.

Subsequently, the control unit 133 generates the shutter control signal for opening and closing the shutter, and outputs the shutter control signal to the shutter 131 (time t3). The shutter 131 releases the shutter for a certain period of time in accordance with the shutter control signal from the control unit 133, so as to allow a light ray which has passed through the optical device 110 to reach the imaging device 132 (time t3 to t4). Accordingly, the imaging apparatus 130 captures an image when the position of the optical device 110 in the rotational direction is the standard position, to thereby generate the first captured image data.

The control unit 133 generates the rotation control signal for changing the position of the optical device 110 in the rotational direction from the standard position to the rotated position, and outputs the rotation control signal to the actuator 120 (time t4). In other words, the control unit 133 generates the rotation control signal for changing the position of the optical device 110 in the rotational direction from the standard position to the rotated position.

The actuator 120 rotates a part or a whole of the optical device 110 in accordance with the rotation control signal (time t4 to t5). As a result, the position of the optical device 110 in the rotational direction changes to the rotated position shown in the state (b) of FIG. 7.

The control unit 133 generates the shutter control signal for opening and closing the shutter, and outputs the shutter control signal to the shutter 131 (time t6). The shutter 131 releases the shutter for a certain period of time in accordance with the shutter control signal from the control unit 133, so as to allow the light ray which has passed through the optical device 110 to reach the imaging device 132 (time t6 to t7). Accordingly, the imaging apparatus 130 captures the image when the position of the optical device 110 in the rotational direction is the rotated position, to thereby generate the second captured image data.

As described above, the imaging apparatus 100 can capture the image for obtaining the depth data and the restored image data. Next, the description is given to the image processing apparatus 200 which generates the depth data and the restored image data, using the captured image data items generated as above.

Figure 10:
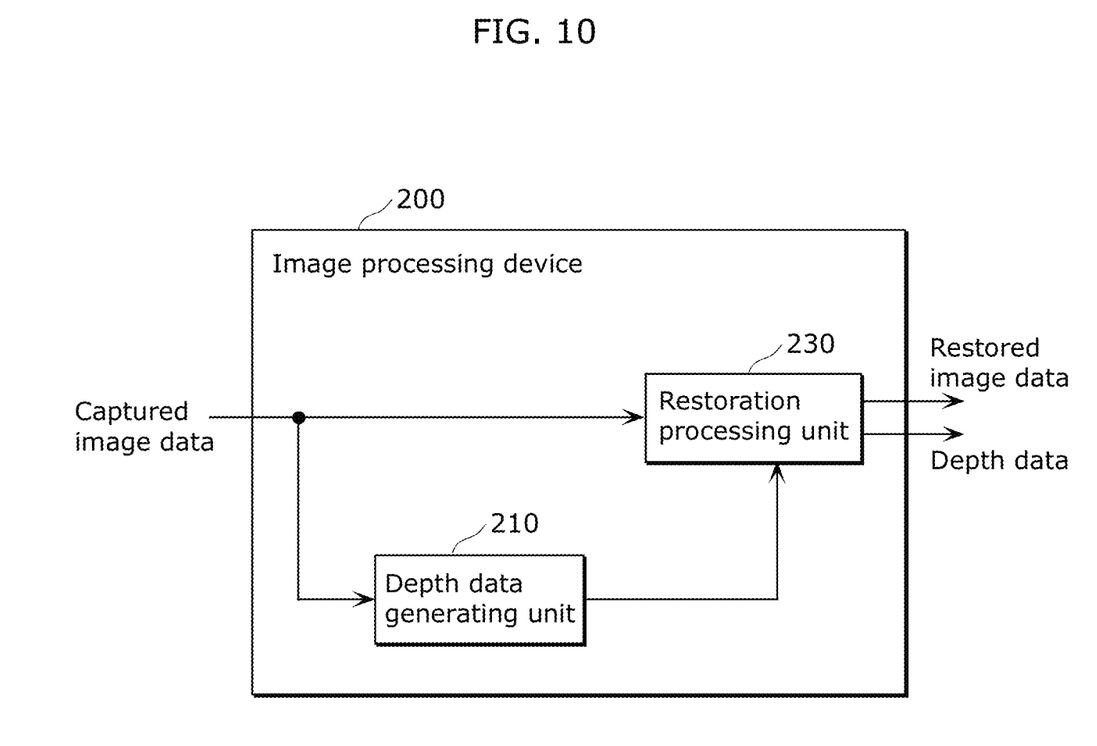
FIG. 10 is a block diagram which shows a configuration of an image processing apparatus according to the embodiment.

FIG. 10 is a block diagram which shows a configuration of an image processing apparatus according to the embodiment. The image processing apparatus 200 performs processing on the captured image data items generated by the imaging apparatus 100, to thereby generate the depth data and the restored image data. As shown in FIG. 10, the image processing apparatus 200 includes a depth data generating unit 210 and a restoration processing unit 230.

The depth data generating unit 210 specifies a frequency having a frequency component value which is lower than or equal to a predetermined threshold value in at least one of the captured image data items. The depth data generating unit 210 generates the depth data based on the specified frequency.

The restoration processing unit 230 performs the restoration processing on the captured image data items based on an optical blur before the optical device 110 is rotated and an optical blur after the optical device 110 is rotated, so as to generate the restored image data. Specifically, the restoration processing unit 230 performs the restoration processing on the captured image data items using a PSF of when the position of the optical device 110 in the rotational direction is the standard position and a PSF of when the position of the optical device 110 in the rotational direction is the rotated position.

Next, the following shall describe a processing operation performed by the image processing apparatus 200 configured as above.

Figure 11:
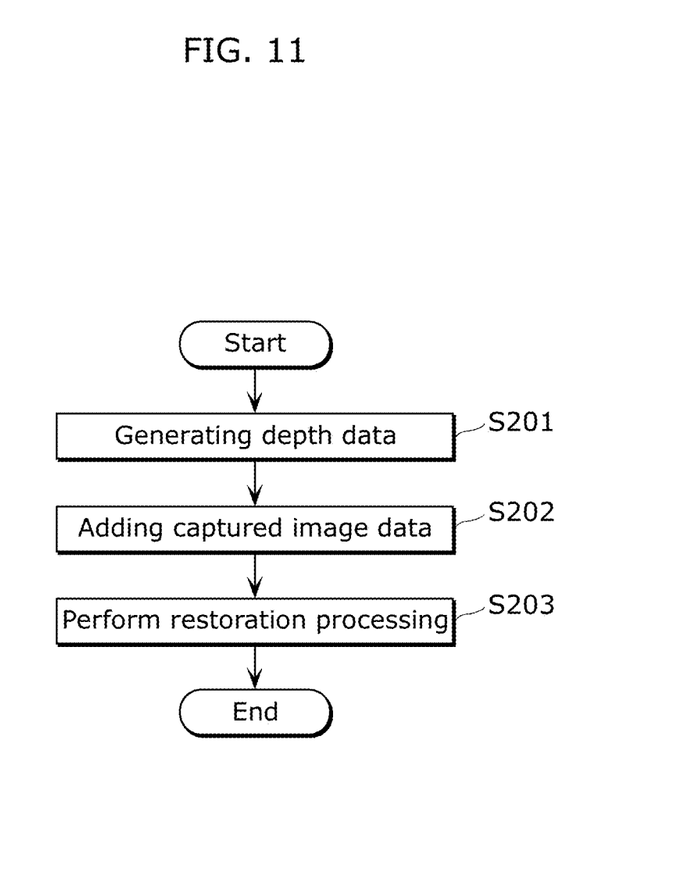
FIG. 11 is a flowchart which shows a processing operation performed by the image processing apparatus according to the embodiment.

FIG. 11 is a flowchart which shows a processing operation performed by the image processing apparatus according to the embodiment. The description is given to a case where two captured image data items (first and second captured image data items) are obtained from the imaging apparatus 100.

The depth data generating unit 210 first generates the depth data based on the frequency having the frequency component value which is smaller than or equal to the predetermined threshold value in at least one of the first and second captured image data items (Step S201). For example, the depth data generating unit 210 generates the depth data using a method similar to the method disclosed in NPL 2 or NPL 3.

It should be noted that the depth data can be generated for each of the captured image data items. Accordingly, the depth data generating unit 210 may generate first and second depth data items from the first and second captured image data items respectively, and generate, as the depth data, an arithmetic mean or a weighted mean of the generated first and second depth data items. With the above, the depth data generating unit 210 can enhance the accuracy in the depth data.

Next, the restoration processing unit 230 generates a single added image data by adding the first and second captured image data items (Step S202).

Subsequently, the restoration processing unit 230 performs the restoration processing on the added image data based on the optical blur before the optical device 110 is rotated and the optical blur after the optical device 110 is rotated, so as to generate the restored image data (Step S203).

To be specific, the restoration processing unit 230 obtains the PSF from a memory (not shown) in which the PSF is previously stored in association with the position of the optical device 110 in the rotational direction and the depth, for example. To be more specific, the restoration processing unit 230 obtains, from the memory, the PSF corresponding to the position of the optical device 110 in the rotational direction of when the first captured image data is captured and the depth indicated by the depth data, for each pixel in the first captured image data. For the second captured image data, the restoration processing unit 230 also obtains the corresponding PSF from the memory.

The restoration processing unit 230 adds the PSF corresponding to the first captured image data (hereinafter, referred to as a "first PSF") and the PSF corresponding to the second captured image data (hereinafter, referred to as a "second PSF"), and performs the restoration processing on the aforementioned added image data.

The restoration processing is processing for reducing a blur in the added image data. Specifically, in the restoration processing, for each of areas in the added image, the frequency transformed image data is divided by a frequency transformed sum of the first PSF and the second PSF, for example. After that, the obtained value is again converted to a value in the spatial domain. The restoration processing may be processing using Lucy-Richardson algorism or Wiener filter algorithm.

The aforementioned processing performed by the restoration processing unit 230 is an example, so that the addition processing (Step S202) may be omitted from the flowchart of FIG. 11. In other words, the restoration processing unit 230 need not necessarily add the captured image data items and also add the PSFs corresponding to the respective captured image data items, in order to perform the restoration processing. For example, the restoration processing unit 230 may generate the restored image data using a method similar to the equation (8) disclosed in NPL 4, without adding the captured image data items.

It should be noted that the restoration processing unit 230 may perform all of the aforementioned processing as a two-dimensional filter in the spatial domain.

As described above, the optical device 110 causes the optical blur shaped in rotational asymmetry, in the imaging apparatus 100 or the imaging system 10 according to the present embodiment. To be specific, the optical blur caused by the optical device before rotation and the optical blur caused by the optical device after rotation are different from each other in the optical property in the two-dimensional planer space. Therefore, in a plurality of images captured every time the optical device rotates, image components lost due to the optical blur in the two-dimensional planer space are also different from each other. Accordingly, in the captured image data items, the image components lost due to the optical blur can be complemented with each other. Such captured image data items are used to generate the restored image data, to thereby enable the improvement of the image quality of the restored image.

Furthermore, with the imaging apparatus 100 or the imaging system 10 according to the present embodiment, the optical blur caused by the optical device can be varied by simply rotating the optical device. This eliminates the necessity of replacement of the optical device for capturing an image, to thereby enable easy capture of the image for obtaining the depth data and the restored image data. Furthermore, a shape of the optical blur caused by the optical device can be varied in a relatively short term, to thereby achieve the imaging apparatus having a high responsive property.

With the imaging apparatus 100 or the imaging system 10 according to the present embodiment, at least one of the value or the number of frequencies in which the frequency component value of the PSF is smaller than or equal to the predetermined threshold value in the spatial frequency domain can be varied according to the depth. Accordingly, the depth data can be generated with high accuracy by specifying the frequency in which the spatial frequency component lacks or is remarkably lost in the captured image data. Thus, the depth data can be generated with high accuracy, and the image quality of the restored image data can be improved.

With the imaging apparatus 100 or the imaging system 10 according to the present embodiment, the optical device can be configured so that the PSF has a plurality of peaks in the spatial domain. This can improve the complementary effect in the image components to be lost due to the optical blur in images captured every time the optical device 110 rotates.

With the imaging apparatus 100 or the imaging system 10 according to the present embodiment, the optical device can include a lens having areas whose in-focus positions are different from one another. If the depth of field is extended by the image captured using such a lens, or by the image captured using the lattice focal lens, the depth of field can be efficiently extended with smaller amount of light in comparison with a case where the depth of field is extended by the image captured with varying the in-focus position. This enables the restored image having a high SN ratio to be obtained.

Although only some exemplary embodiments for the imaging apparatus 100, the imaging processing apparatus 200, and the imaging system 10 have been described in detail above, the present invention is not limited thereto. Various modifications added to the present embodiment, which are conceivable by a person skilled in the art are included in the scope of the present invention as long as the modifications do not depart from the scope of the invention.

For example, in the aforementioned embodiment, the description was mainly given to the case where two captured image data items are generated. However, three or more captured image data items may be generated. In such a case, the optical device is rotated twice or more, for example, and an image should be captured at each rotation of the optical device. If three or more captured image data items are used, complementary effect in the frequency components lost due to the optical blur can be further improved. This enables the image quality of the restored image to be further improved.

In addition, the imaging apparatus or the image processing apparatus according to the aforementioned embodiment may include components for performing typical image processing, such as chromatic compensation, gamma compensation, Bayer interpolation, and the like, on the captured image. The image processing apparatus may further include a storage unit for temporarily holding the captured image data.

Although the rotational angle of the optical device 110 is not particularly limited in the aforementioned embodiment, it is desirable for the rotational angle to be previously set so that the frequency component lost due to the optical blur is efficiently complemented. Specifically, the rotational angle may be such an angle by which a combination of the PSFs can be obtained which allows a minimum value of the frequency components of the added PSFs to be largest, among combinations of the PSFs corresponding to the respective positions of the optical device in the rotational direction. This enhances the complementary effect in the frequency components lost due to the optical blur in the captured image data items, to thereby improve the image quality of the restored image.

The optical blur need not necessarily be expressed by the PSF. For example, the optical blur may be expressed by a two-dimensional complex number component obtained after the PSF is converted to the frequency domain.

A part or all of the components included in the image processing apparatus 200 according to the aforementioned embodiment may be configured by a single system large scale integration (system LSI). For example, the image processing apparatus 200 may be configured by the system LSI including the depth data generating unit 210 and the restoration processing unit 230.

The system LSI is a super multifunction LSI manufactured by integrating a plurality of components on a single chip. Specifically, the system LSI is a computer system which includes a microprocessor, a read only memory (ROM), a random access memory (RAM), and the like. In the ROM, a computer program is stored. The microprocessor operates in accordance with the computer program, allowing the system LSI to achieve its function.

Although the system LSI is used for the present embodiment, the system LSI may be referred to as an IC, LSI, super LSI; or ultra LSI according to respective integration degrees. It is not limited for integration circuit to be formed by the LSI, but a dedicated circuit or a general processor may be employed. A field programmable gate array (FPGA) may be used which can be programmed after the LSI is manufactured. Alternatively, a reconfigurable processor may be used in which connection or setting of circuit cells in the LSI can be reconfigured.

If integrated-circuit configuring technology which substitutes for the LSI is achieved along with technical advance in a semiconductor field or by derived different technology, the technology may be naturally used to integrate functional blocks. Biotechnology may be applied as one of possibilities.

Furthermore, the present invention can also be achieved not only as the imaging apparatus, image processing apparatus, or the imaging system which include the aforementioned distinguishing components, but also as the imaging method or the image processing method which executes processing performed by the distinguishing components included in the imaging apparatus, image processing apparatus, or imaging system. The present invention can be achieved as a computer program which causes a computer to execute the respective distinguishing steps included in the image processing method. It is also natural that such a computer program can be distributed via a computer readable non-transitory recording medium, such as a compact disc read only memory (CD-ROM), or a communication network, such as the Internet.

INDUSTRIAL APPLICABILITY

The present invention can be used as an imaging apparatus such as a digital still camera or a digital video camera.

REFERENCE SIGNS LIST

10 Imaging system
100 Imaging apparatus
110 Optical device
111 Lens
112 Aperture
120 Actuator
130 Imaging unit
131 Shutter
132 Imaging device
133 Control unit
200 Image processing apparatus
210 Depth data generating unit
230 Restoration processing unit

The invention claimed is:

1. An imaging apparatus which captures an image used for obtaining depth data indicating a depth of a captured scene and restored image data with a depth of field extended and with an optical blur reduced in a range corresponding to the extended depth of field, the imaging apparatus comprising:
   an optical device which includes a lattice focal lens that (i) causes an optical blur having a rotationally asymmetric shape and (ii) varies, by being rotated, the optical blur;
   an actuator which rotates the lattice focal lens of the optical device from a first angle to a second angle; and
   a sensor configured to generate a plurality of captured image data items by having a first image captured by the optical device at the first angle and having a second image captured by the optical device at the second angle,
   wherein the optical blur caused by the lattice focal lens of the optical device at the second angle complements a frequency component that is lost due to the optical blur caused by the lattice focal lens of the optical device at the first angle.

2. The imaging apparatus according to claim 1,
   wherein the optical blur is expressed by a point spread function (PSF), and
   the optical device has the PSF which varies according to the depth.

3. The imaging apparatus according to claim 2,
   wherein the optical device has the PSF which includes one or more frequencies each of which has a frequency component value smaller than or equal to a predetermined threshold value in a spatial frequency domain.

4. The imaging apparatus according to claim 3,
   wherein the optical device has the PSF in which at least one of a value and the number of the one or more frequencies varies according to the depth in the spatial domain, each of the one or more frequencies having the frequency component value smaller than or equal to the threshold value.

5. The imaging apparatus according to claim 2,
   wherein the optical device has the PSF which has a plurality of peaks in a spatial domain.

6. The imaging apparatus according to claim 1,
   wherein the lattice focal lens of the optical device is a lens having a plurality of areas whose in-focus positions are different from each other.

7. The imaging apparatus according to claim 1,
   wherein the optical device includes an aperture having a plurality of openings.

8. An imaging system comprising:
   imaging apparatus according to claim 1; and
   an image processing apparatus which performs processing on the captured image data items generated by the imaging apparatus to generate the depth data and the restored image data,
   wherein the image processing apparatus includes:
   a processor; and
   a non-transitory computer readable medium having stored thereon instructions that, when executed by the processor, cause the image processing apparatus to:
   generate the depth data based on a frequency having a spatial frequency component value which is smaller than or equal to a predetermined threshold value in at least one of the captured image data items; and
   perform restoration processing on the captured image data items based on the optical blur corresponding to each of the captured image data items, to generate the restored image data.

9. An imaging method for capturing an image used for obtaining depth data indicating a depth of a captured scene and restored image data with a depth of field extended and with an optical blur reduced in a range corresponding to the extended depth of field, using an imaging apparatus, the imaging apparatus including:
   an optical device which includes a lattice focal lens that (i) causes an optical blur having a rotationally asymmetric shape and (ii) varies, by being rotated, the optical blur; and
   an actuator for rotating the lattice focal lens of the optical device from a first angle to a second angle,
   the imaging method comprising:
   capturing, using the optical device, a first image at the first angle to generate a first captured image data item;
   rotating, using the actuator, the lattice focal lens of the optical device from the first angle to the second angle; and
   capturing, using the optical device, a second image at the second angle to generate a second captured image data item,
   wherein the optical blur caused by the lattice focal lens of the optical device at the second angle complements a frequency component that is lost due to the optical blur caused by the lattice focal lens of the optical device at the first angle.

10. An image processing method for capturing an image using an imaging apparatus, and performing processing on the captured image, the imaging apparatus including:
    an optical device which includes a lattice focal lens that (i) causes an optical blur having a rotationally asymmetric shape and (ii) varies, by being rotated, the optical blur; and
    an actuator which rotates the lattice focal lens of the optical device from a first angle to a second angle,
    the image processing method comprising:
    capturing, using the optical device, a first image at the first angle to generate a first captured image data item;

rotating, using the actuator, the lattice focal lens of the optical device from the first angle to the second angle;

capturing, using the optical device, a second image at the second angle to generate a second captured image data item;

generating depth data indicating a depth of a captured scene based on a frequency having a spatial frequency component value which is smaller than or equal to a predetermined threshold value in at least one of the first captured image data item and the second captured image data item; and performing restoration processing on the captured image data items based on the optical blur corresponding to each of the first and second captured image data items, to generate restored image data with a depth of field extended and with the optical blur reduced in a range corresponding to the extended depth of field, wherein the optical blur caused by the lattice focal lens of the optical device at the second angle complements a frequency component that is lost due to the optical blur caused by the lattice focal lens of the optical device at the first angle.

* * * * *